(12) United States Patent
Teodorescu

(10) Patent No.: US 6,763,016 B1
(45) Date of Patent: Jul. 13, 2004

(54) METHOD AND SYSTEM FOR DISTRIBUTING A SYNCHRONIZATION SIGNAL IN A TELECOMMUNICATIONS NETWORK

(75) Inventor: Ioan V. Teodorescu, Plano, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/539,368

(22) Filed: Mar. 31, 2000

(51) Int. Cl.[7] .................................................. H04J 3/06
(52) U.S. Cl. ...................... 370/350; 370/508; 370/509
(58) Field of Search ................................ 370/503, 508, 370/509, 510, 512, 386; 375/354, 356

(56) References Cited

U.S. PATENT DOCUMENTS

| | | | |
|---|---|---|---|
| 5,335,228 A | | 8/1994 | Bottiglieri et al. |
| 5,734,685 A | | 3/1998 | Bedell et al. |
| 5,901,136 A | * | 5/1999 | Lovelace et al. ............ 370/217 |
| 6,370,155 B1 | * | 4/2002 | Cantwell et al. ............ 370/465 |
| 6,389,013 B1 | * | 5/2002 | Doss et al. .................. 370/364 |

OTHER PUBLICATIONS

U.S. patent application Ser. No. 09/539,405, entitled "Method and System for Providing a Feedback Signal in a Telecommunications Network," filed Mar. 31, 2000, 51 pages. (036560.6701).

* cited by examiner

Primary Examiner—Frank Duong
Assistant Examiner—Melanie Jagannathan
(74) Attorney, Agent, or Firm—Baker Botts; Craig A. Hoersten; V. Lawrence Sewell

(57) ABSTRACT

A system for distributing a synchronization signal in a telecommunications network is provided that includes a timing generator, a lower level distribution module, a bus control module and a plurality of cards. The timing generator is operable to provide a synchronization signal comprising timing and control signals. The lower level distribution module is coupled to the timing generator. The lower level distribution module is operable to receive and distribute the synchronization signal. The bus control module is coupled to the lower level distribution module. The bus control module is operable to receive and distribute the synchronization signal. The plurality of cards are coupled to the bus control module. Each card is operable to receive the synchronization signal and to synchronize based on the timing signals.

16 Claims, 5 Drawing Sheets

METHOD AND SYSTEM FOR DISTRIBUTING A SYNCHRONIZATION SIGNAL IN A TELECOMMUNICATIONS NETWORK

TECHNICAL FIELD OF THE INVENTION

This invention relates generally to the field of telecommunication systems and more specifically to a method and system for distributing a synchronization signal in a telecommunications network.

BACKGROUND OF THE INVENTION

Conventional methods for distributing a synchronization signal utilize multiple levels of processors to direct the synchronization signal through the network. These methods also distribute the synchronization signal separately from control signals. Multiple levels of processors and distribution of the synchronization signal separate from other control signals, however, require complicated hardware and software in system modules for implementation, in addition to a relatively large number of lines for providing the separate signals, which results in lower efficiency and higher cost.

SUMMARY OF THE INVENTION

In accordance with the present invention, a method and system for distributing a synchronization signal in a telecommunications network are provided that substantially eliminate or reduce the disadvantages and problems associated with previously developed systems and methods. In particular, a composite synchronization signal is provided that includes timing and control messages, allowing reduced complexity in system modules and decreasing the number of lines needed for implementation.

According to one embodiment of the present invention, a system for distributing a synchronization signal in a telecommunications network is provided that includes a timing generator, a lower level distribution module, a bus control module and a plurality of cards. The timing generator is operable to provide a synchronization signal comprising timing and control signals. The lower level distribution module is coupled to the timing generator. The lower level distribution module is operable to receive and distribute the synchronization signal. The bus control module is coupled to the lower level distribution module. The bus control module is operable to receive and distribute the synchronization signal. The plurality of cards are coupled to the bus control module. Each card is operable to receive the synchronization signal and to synchronize based on the timing signals.

Technical advantages of the present invention include providing an improved system for distributing a synchronization signal in a telecommunications network. In particular, a timing generator provides a composite synchronization signal that includes timing and control messages. As a result, system modules may be designed without the complicated hardware and/or software required to generate the signals included in the synchronization signal. Accordingly, implementation costs are reduced, while efficiency is increased. In addition, including a plurality of messages in the composite signal allows the number of lines required for implementing the system to be reduced.

Other technical advantages of the present invention include providing additional levels of error detection. In particular, each bit other than the bits making up a synchronization word is repeated twice, and each message is repeated three times. As a result, the reliability of the synchronization word is improved, and frames containing errors are easily identifiable.

Yet another technical advantage of the present invention includes the generation of shelf identifiers. A module in each level of the system provides a portion of a shelf identifier for each shelf downstream of that module. As a result, a message within the synchronization signal may be provided for a specific shelf without requiring an address for the shelf. Instead, the shelf receives an identifier from an upstream module which may be used to extract the appropriate message for that shelf from the synchronization signal. Accordingly, shelf-specific messages for many shelves may be included with the other timing and control signals in a single synchronization signal.

Other technical advantages will be readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
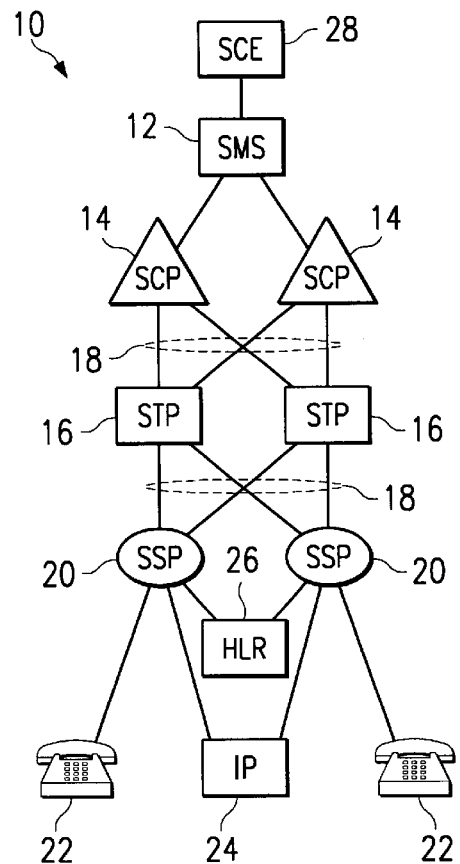
FIG. 1 is a block diagram illustrating an exemplary telecommunications network such as an advanced intelligent network for use in connection with the present invention.

FIG. 1 is a block diagram illustrating an advanced intelligent network 10 for use in connection with the present invention. The advanced intelligent network 10 includes a service management system 12 that interfaces with a plurality of service control points 14 and a plurality of signal transfer points 16 via an industry standard protocol, such as X.25. The service management system 12 provides network information, database management, and administrative support for the advanced intelligent network 10. The service management system 12 generally interfaces with service control points 14 for provisioning, database management, service control point application program management, and collecting traffic metering measurement data.

The service control points 14 may be directly linked to the signal transfer points 16 via a signaling system number 7 link set 18. The signal transfer points 16 are further coupled through signaling system number 7 link set 18 to one or more service switching points 20, which perform switching and call handling functions in the network 10. The service control points 14 are transaction-based processing systems whose primary responsibility is to respond to queries from service switching points 20 for data needed to complete the routing of a call. The service switching points 20 are part of a public switched telephone network and are coupled to the telephone service subscribers, which include wire-based telephones and wireless telephones 22, intelligent peripherals 24 and home location registers 26.

A service creation environment 28 allows the creation and testing of service logic programs outside of the network 10. Completed service logic programs are downloaded to the service control points 14 and the signal transfer points 16 through the service management system 12 for execution on the network 10.

Figure 2A:
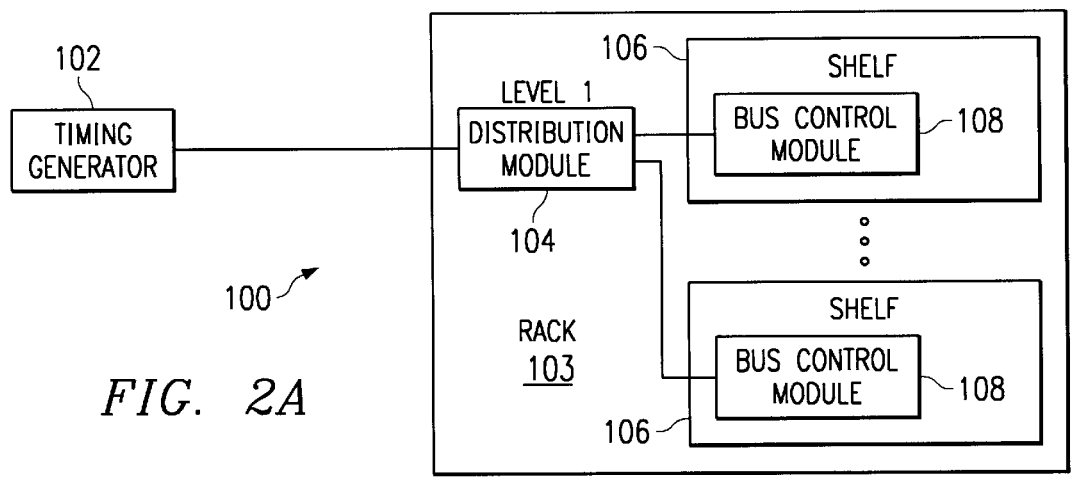
FIG. 2A is a block diagram illustrating a one-level system for distributing a synchronization signal in a telecommunications network such as the network of FIG. 1 in accordance with one embodiment of the present invention.

FIG. 2A is a block diagram illustrating a one-level system 100 for distributing a synchronization signal in a telecommunications network such as the network 10 in accordance with one embodiment of the present invention. The system 100 comprises a timing generator 102 and one or more racks 103. The timing generator 102 generates timing and control signals for distribution to the racks 103 of the system 100 in a framed signal that includes fields for transmitting specific types of data. Thus, since the timing generator 102 provides the timing and control signals, downstream modules in the racks 103 of the system 100 may be designed without the complicated hardware and/or software required to generate these signals. This reduces the cost and increases the efficiency of the system 100.

The rack 103 comprises a distribution module 104 and a plurality of shelves 106. Each shelf 106 comprises one or more bus control modules 108. In operation, the distribution module 104 receives the framed signal from the timing generator 102 and distributes the signal to the bus control modules 108. The bus control modules 108 distribute the signal to cards (not shown in FIG. 2A) inserted into the shelves 106. Although the illustrated embodiment includes one bus control module 108 for each shelf 106, it will be understood that each shelf 106 may include any suitable number of bus control modules 108 without departing from the scope of the present invention.

According to one embodiment, the bus control modules 108 receive a feedback signal, which includes signal status information, and a derived clock signal from each of the cards inserted into the shelves 106. The bus control modules 108 transmit signals to the distribution module 104 based on the signals from the cards, and the distribution module 104 transmits signals to the timing generator 102 based on the signals from the bus control modules 108. The timing generator 102 selects one of the derived clock signals received from the distribution module 104 for distribution to the system 100 as a timing signal.

Figure 2B:
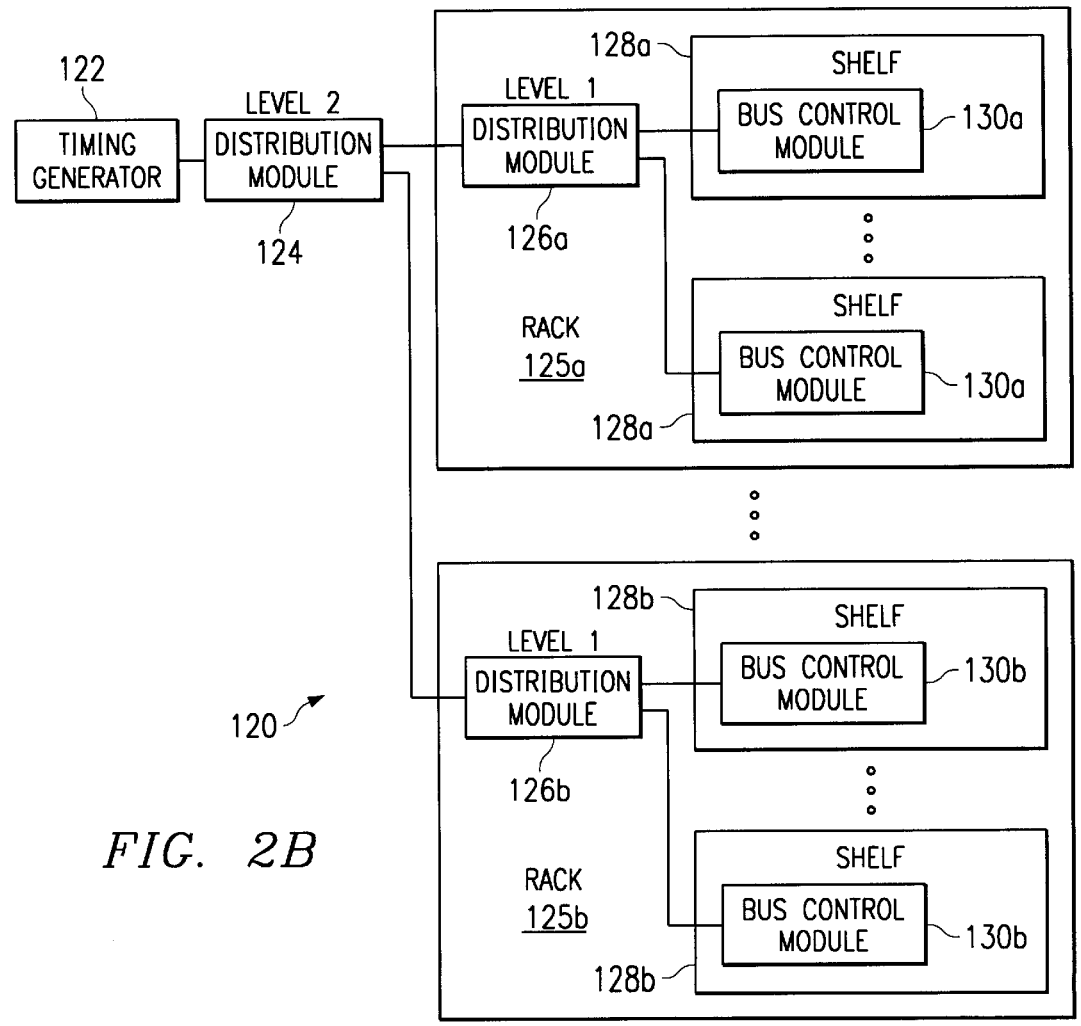
FIG. 2B is a block diagram illustrating a two-level system for distributing a synchronization signal in a telecommunications network such as the network of FIG. 1 in accordance with another embodiment of the present invention.

FIG. 2B is a block diagram illustrating a two-level system 120 for distributing a synchronization signal in a telecommunications network such as the network 10 in accordance with another embodiment of the present invention. The system 120 comprises a timing generator 122, a distribution module 124 and a plurality of racks 125a–b which operate in a manner similar to the components of the system 100.

In one embodiment, the timing generator 122 generates timing and control signals for distribution to the racks 125a–b of the system 120 through the distribution module 124 in a framed signal. Thus, downstream modules of the system 120 may be designed without the complicated hardware and/or software required to generate these signals. The racks 125a–b each comprise a distribution module 126a–b and a plurality of shelves 128a–b. Each shelf 128a–b comprises one or more bus control modules 130a–b.

In operation, the distribution module 124 receives the framed signal from the timing generator 122 and distributes the signal to the distribution modules 126a–b of the racks 125a–b. The distribution modules 126a–b distribute the signal to the bus control modules 130a–b, which distribute the signal to cards (not shown in FIG. 2B) inserted into the shelves 128a–b.

According to one embodiment, the bus control modules 130a–b receive a derived clock signal and a feedback signal from each of the cards inserted into the shelves 128a–b. The bus control modules 130a–b transmit signals to the corresponding distribution modules 126a–b based on the signals from the cards, and the distribution modules 126a–b transmit signals to the distribution module 124 based on the signals from the bus control modules 130a–b. The distribution module 124 then transmits signals to the timing generator 122 based on the signals from the distribution modules 126a–b. The timing generator 122 selects one of the derived clock signals received from the distribution module 124 for distribution through the system 120 as a timing signal.

Figure 3:
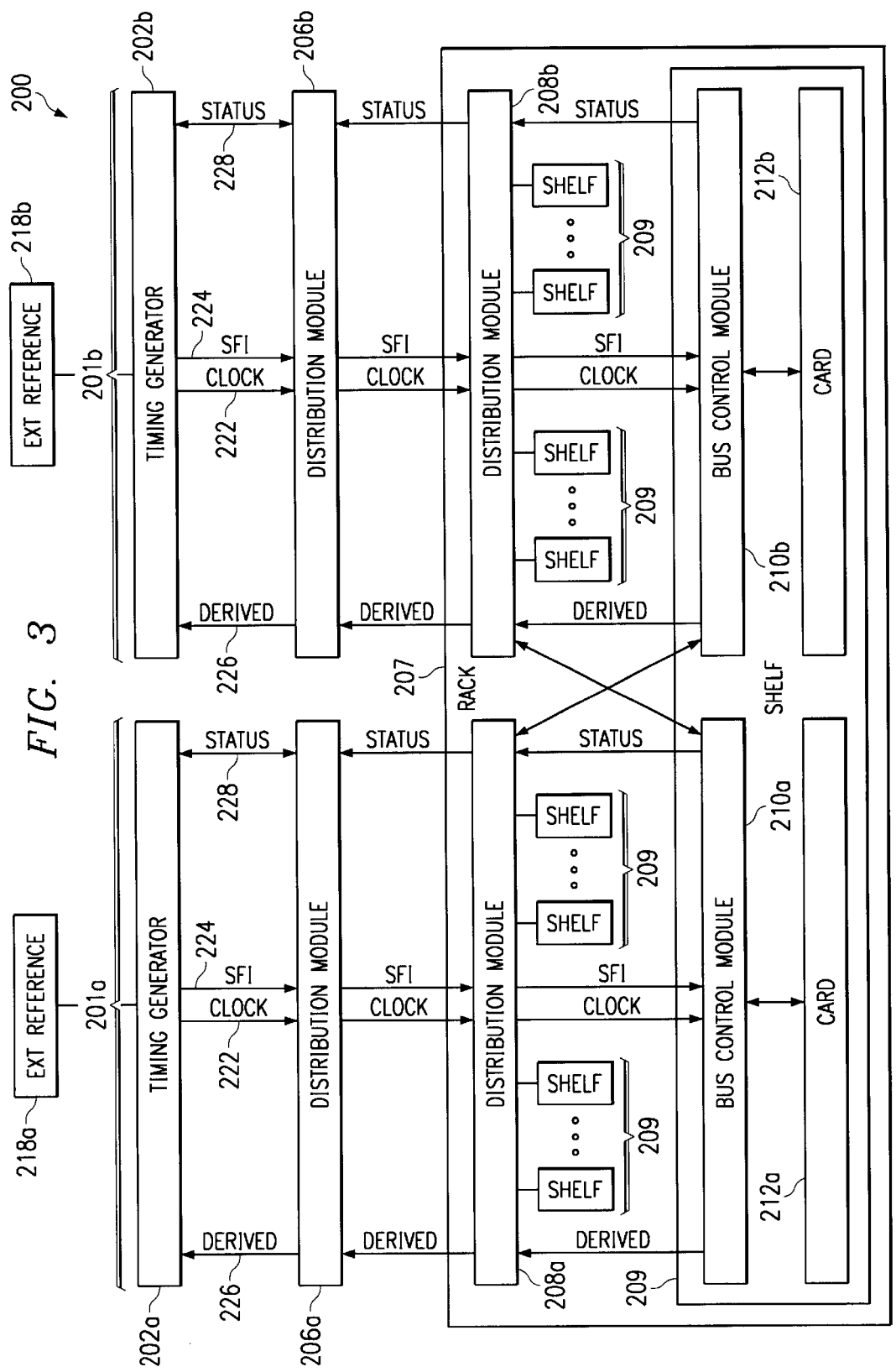
FIGS. 3A–B are a block diagram illustrating a two-level, redundant system for distributing a synchronization signal in a telecommunications network such as the network of FIG. 1 in accordance with one embodiment of the present invention.

FIGS. 3A–B are a block diagram illustrating a two-level, redundant system 200 for distributing a synchronization signal in a telecommunications network such as the network 10 in accordance with one embodiment of the present invention. The system 200 comprises redundant planes 201a–b of components for providing communication within the system 200. Each plane 201a–b is operable to distribute a synchronization signal and serves as a backup in the event of a failure in the other plane 201a–b. Although the illustrated system 200 comprises two planes 201a–b, it will be understood that the system 200 may comprise any suitable number of planes without departing from the scope of the present invention.

For the illustrated two-level embodiment, each plane 201a–b comprises a timing generator 202a–b, an upper level distribution module 206a–b, and a rack 207 comprising a plurality of lower level distribution modules 208a–b and a plurality of shelves 209. As will be described in more detail below, each timing generator 202a–b communicates with a upper level distribution module 206a–b which communicates with a plurality of lower level distribution modules 208a–b. Each lower level distribution module 208a–b communicates with a plurality of shelves 209, each of which also communicates with the lower level distribution module 208a–b of the redundant plane 201a–b.

Each shelf 209 comprises a bus control module 210a for communicating with a card 212a over a back plane (not shown) and a bus control module 210b for communicating with a card 212b over a redundant back plane (not shown). Although the illustrated embodiment includes one card 212a and one card 212b, it will be understood that any suitable number of cards 212*a–b* may be included without departing from the scope of the present invention. For an exemplary embodiment, each shelf 209 comprises eight cards 212*a* and eight cards 212*b*.

Additionally, the timing generators 202*a–b* receive signals from the system 200 that include signal status information and derived clock signals. The timing generators 202*a–b* may select a derived clock signal as a timing signal to distribute through the system 200.

Although the illustrated embodiment comprises two levels of distribution modules 206*a–b* and 208*a–b*, it will be understood that any suitable number of levels may be included without departing from the scope of the present invention. For one embodiment, each rack comprises a lower level distribution module. Thus, a one level system may comprise one lower level distribution module. Each additional level added to the system may comprise a distribution module capable of communicating with a specified number of downstream distribution modules.

Thus, a two-level system may comprise one upper level distribution module with eight ports for communicating with eight downstream distribution modules and eight racks, each comprising a lower level distribution module. Likewise, a three-level system may comprise one upper level distribution module with twelve ports for communicating with twelve downstream distribution modules, twelve intermediate level distribution modules each with eight ports for communicating with eight downstream distribution modules, and eight racks, each comprising a lower level distribution module.

Returning to the two-level embodiment illustrated in FIGS. 3A–B, the timing generator 202*a* may comprise a compact peripheral component interface (cPCI) compatible timing card located in an administration shelf of the system 200. The timing generator 202*a* may comprise an onboard system synchronizer circuit that meets Stratum 3 requirements for jitter, wander, free-run accuracy, and holdover. The circuit of the timing generator 202*a* may implement frequency locking of the time base to an external synchronization signal. In one embodiment, the timing generator 202*a* may be configured to work in a master-slave mode with the timing generator 202*b* in order to minimize the skew between corresponding timing signals generated by the timing generators 202*a–b*.

According to one embodiment, the distribution modules 206*a–b* and 208*a–b* comprise circuit cards that distribute signals to and receive signals from other distribution modules or shelves 209. The distribution modules 206*a–b* and 208*a–b* may be located in an administration shelf of the system 200 near a power supply unit. The rack 207 may comprise a European Telecommunications Standards Institute rack or other suitable rack.

In one embodiment, the timing generator 202*a* receives external signals from an external reference 218*a*. The external reference 218*a* may be a DS1/E1 signal, a building-integrated timing source signal, a sine wave input, a derived timing signal, a composite clock signal or any other suitable signal. The external reference 218*a* may be received over a twisted pair, a coaxial cable or other suitable input line.

Based on the, external reference 218*a*, the timing generator 202*a* generates control and timing signals for distribution through the plane 201*a*. Since the timing generator 202*a* provides the timing and control signals, downstream modules such as distribution modules 206*a* and 208*a* and the bus control module 210*a* are not required to include the complicated hardware and/or software necessary for generating these signals. Thus, the hardware and software design of the system 200 is simplified, resulting in increased efficiency and reduced costs.

According to one embodiment, the timing generator 202*a* communicates a clock signal 222 and a framed signal, such as a superframe indicator (SFI) signal 224, to the timing generator 202*b* of plane 201*b* and to the upper level distribution module 206*a*. The clock signal 222 may comprise a 19.44 MHz system clock signal or any other suitable clock signal. As described in more detail below in connection with FIG. 4A, the SFI signal 224 includes timing and control signals and distributes timing and control information to individual modules of the system 200. In this way, the SFI signal 224 synchronizes the cards 212*a–b* with the system 200 and allows messages to be distributed to each card 212*a–b* from a central location. The timing generator 202*b* operates in a manner similar to the timing generator 202*a*.

For example, the SFI signal 224 may include information that instructs each module on which signal to use as a timing signal. The control signals may comprise information directing the operation of the system 200, such as instructions regarding which plane 201*a–b* is active and which plane 201*a–b* is inactive. The control signals may also include time of day, reset commands, alarms, frame indicators, tones, announcements, and any other suitable signals. By including these signals in the SFI signal 224, the system 200 reduces the complexity of hardware and software required for the system 200.

The upper level distribution module 206*a* receives the clock signal 222 and the SFI signal 224 from the timing generator 202*a* and sends the signals 222 and 224 to the lower level distribution module 208*a*. The lower level distribution module 208*a* sends the signals 222 and 224 to the shelf 209. The lower level distribution module 208*a* receives a derived clock signal 226 and a feedback signal 228 from the shelf 209 and transmits the signals 226 and 228 to the upper level distribution module 206*a*, which transmits the signals 226 and 228 to the timing generator 202*a*. The distribution modules 206*a* and 208*a* may use a field programmable gate array (FPGA), application-specific integrated circuit, software or other suitable device to monitor signals, align signals, extract data from signals, discard defective information, report problems using the feedback signal 228, or perform other suitable functions. According to one embodiment, a Xilinx 4028XLA SRAM-based FPGA in a 240-pin PQSP package is used to perform these functions. The upper level distribution modules 206*b* and 208*b* operate in a manner similar to the distribution modules 206*a* and 208*a*.

According to one embodiment, the lower level distribution modules 208*a* and 208*b* transmit the clock signal 222 and the SFI signal 224 to the bus control modules 210*a* and 210*b* of the shelf 209. Although the illustrated shelf 209 comprises two bus control modules 210*a–b*, it will be understood that the shelf 209 may comprise any suitable number of bus control modules without departing from the scope of the present invention.

According to one embodiment, the bus control module 210*a* comprises a bus control card that, in conjunction with the bus control module 210*b*, distributes timing and other signals to the card 212*a* inserted into the shelf 209. The bus control module 210*a* receives pairs of clock signals 222 and SFI signals 224 from the lower level distribution modules 208*a* and 208*b*. The bus control module 210*a* aligns the signals, selects the highest quality signal from each pair of signals using a selector, and distributes the selected signals to the card 212a. The card 212a may comprise a simple board, an intelligent slave, a PCI bus master, or the like, for performing functions for the system 200.

The bus control module 210a also receives the derived clock signal 226 and the feedback signal 228 from the card 212a. A status generator of the bus control module 210a monitors the status using feedback signals 228 and reports the signal status on output feedback signals. A selector of the bus control module 210a selects the highest quality derived clock signals 226 and sends the signals to the lower level distribution modules 208a–b. The bus control module 210b operates in a manner similar to the bus control module 210a.

The lower level distribution module 208a receives the derived clock signal 226 and feedback signal 228 from the shelf 209, multiplexes the signals, and transmits signals 226 and 228 to the upper level distribution module 206a, which in turn transmits the signals 226 and 228 to the timing generator 202a. Control pins may be used to define the transceivers that receive the signals 226 and 228.

The timing generator 202a receives a derived clock signal 226 and a feedback signal 228 from the upper level distribution module 206a and the timing generator 202b. The derived clock signal 226 and the feedback signal 228 are transmitted from the shelf 209 to the bus control module 210a, through the distribution modules 206a–208a, and to the timing generator 202a. The derived clock signal 226 may include, for example, an 8 kHz derived clock signal from a network interface. The timing generator 202a may select the derived clock signal 226 as a timing signal to distribute through the plane 201a using the SFI signal 224. The feedback signal 228 includes alarms and other signals collected from the shelf 209, the bus control module 210a and the upper level distribution modules 206a–208a. The timing generator 202a may implement corrective action in response to the feedback signal 228.

Thus, messages are transmitted both downstream and upstream between the timing generator 202a and the card 212a. For the exemplary embodiment, a message included in the SFI signal 224 for the card 212a comprises a shelf identifier. For the three-level embodiment previously described, the timing generator 202a provides the SFI signal 224 to the upper level distribution module without a shelf identifier. The upper level distribution module inserts the most significant nibble (MSN) of the shelf identifier into the SFI signal 224. Because each intermediate level distribution module communicates with different shelves 209, the MSN inserted by the upper level distribution module is different for each port so that each intermediate level distribution module receives a different MSN for the shelf identifier.

Similarly, the intermediate level distribution modules insert the second nibble of the shelf identifier into the SFI signal 224. Because each lower level distribution module communicates with a plurality of shelves 209, the second nibble inserted by the intermediate level distribution module is different for each port so that each lower level distribution module receives a different second nibble for the shelf identifier.

Finally, the lower level distribution module inserts the least significant nibble (LSN) of the shelf identifier into the SFI signal 224 before providing the SFI signal 224 to each shelf 209. Because each lower level distribution module communicates with a plurality of shelves 209, the LSN inserted by the lower level distribution module is different for each port so that each shelf 209 receives a different shelf identifier.

Figure 4A:
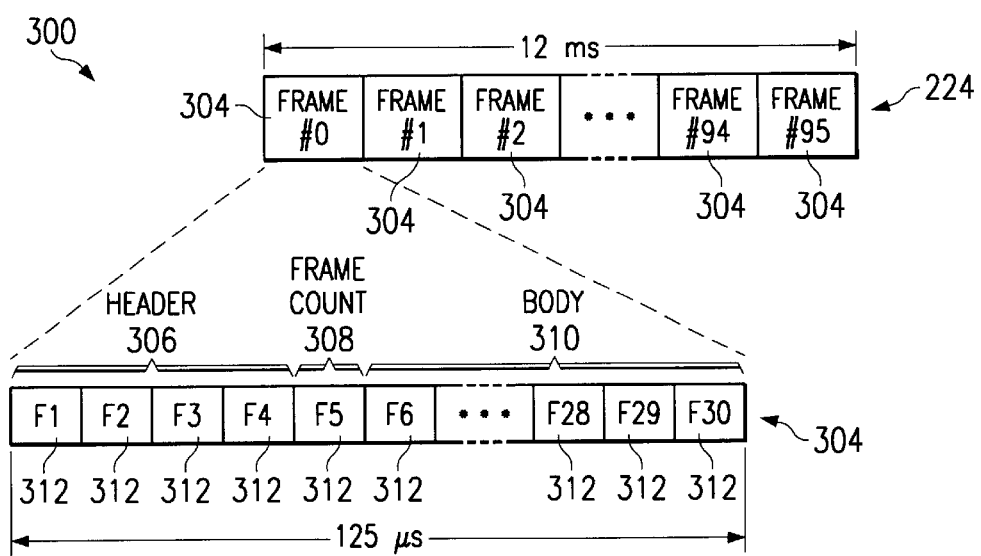
FIG. 4A is a block diagram illustrating a frame structure for a synchronization signal distributed by the system of FIG. 3 in accordance with one embodiment of the present invention.

FIG. 4A is a block diagram illustrating a frame structure 300 for a synchronization signal, such as the superframe indicator (SFI) signal 224, distributed by the system 200 in accordance with one embodiment of the present invention. In accordance with an exemplary embodiment, the SFI signal 224 comprises ninety-six frames 304. This allows both T1 and E1 standards to be met because a T1 signal includes twenty-four frames and an E1 signal includes sixteen frames. Thus, as ninety-six is evenly divisible by both twenty-four and sixteen, the T1 and E1 signals may be provided in the SFI signal 224 with ninety-six frames 304. It will be understood, however, that the SFI signal 224 may include any other suitable number of frames 304 without departing from the scope of the present invention.

For the exemplary embodiment, each frame 304 is approximately 125 microseconds, making the SFI signal 224 approximately 12 milliseconds. In addition, the timing of the SFI signal 224 may be based on a composite clock signal from the timing generator 202a–b, with one frame 304 of the SFI signal 224 provided in each clock cycle. The SFI signal 224 may also comprise the byte phase of the composite clock signal.

Each frame 304 comprises a header 306, a frame count 308 and a body 310. According to the exemplary embodiment, the frame 304 comprises thirty fields 312, four for the header 306, one for the frame count 308, and twenty-five for the body 310. It will be understood, however, that the frame 304 may comprise any suitable number of fields 312 without departing from the scope of the present invention.

At least three forms of error detection are provided for allowing the modules of a telecommunication system to detect errors within a frame 304. The first form of error detection includes bit repeating. Each bit in the frame 304 is repeated twice with the exception of a synchronization word, as described in more detail below. Thus, a two-bit violation occurs when a 010 or a 101 is encountered in the frame 304 after the synchronization word. The second form of error detection includes a bit interleaved parity (BIP) byte that allows the modules to check the parity for the frame 304. The third form of error detection includes message repeating. Each control message in the frame 304 is transmitted in at least three consecutive frames 304. Thus, a violation occurs when a control message fails to be repeated in at least three consecutive frames 304. It will be understood that the bits and control messages may be repeated any suitable number of times without departing from the scope of the present invention. It will also be understood that any other suitable forms of error detection may be provided without departing from the scope of the present invention. If any error is detected, the frame 304 is discarded.

For the exemplary embodiment, the header 306 of the frame 304 comprises four fields 312. Field 1 comprises a six-bit synchronization word. As described above, each bit in the frame 304, other than those in Field 1, is repeated for error detection. Thus, a 010 or a 101 appearing in Fields 2–30 indicates an error. Because of this bit repeating for error detection, the six-bit synchronization word in Field 1 of the header 306 may comprise the string 010101 or, alternatively, 101010. Thus, a relatively short, yet extremely reliable, synchronization word is provided, with false synchronization words only possible in the presence of a series of two-bit violations in the remaining fields 312.

Field 2 comprises two bits for a time stamp. For example, according to one embodiment, the time stamp may comprise 00 for a string of sixty-seven consecutive SFI signals 224 and may comprise 11 for the sixty-eighth SFI signal 224. It will be understood that other suitable forms of time stamping may be used without departing from the scope of the present invention. Field 3 comprises four bits for identifying a distribution module 206*a–b* or 208*a–b*. Field 4 comprises two bits for identifying which plane 201*a* or 201*b* is to be used. Thus, for example, Field 4 may comprise 00 to indicate that plane 201*a* is to be used and may comprise 11 to indicate that plane 201*b* is to be used. It will be understood that the planes 201*a–b* may be identified by any suitable combination of bits.

According to the exemplary embodiment, the frame count 308 comprises one field 312. For this embodiment, Field 5 comprises eight bits that identify the frame 304 by a number 0 through 95 which indicates the location of the frame 304 within the SFI signal 224.

For the exemplary embodiment, the body 310 comprises twenty-five fields 312. Field 6 comprises eight bits, three of which indicate an SFI count from 0 to 7, one of which indicates the status of the SFI signal 224, one of which indicates the status of the clock signal 222, and three of which may be used to communicate any suitable data. Field 7 comprises six bytes for providing the time of day. Field 8 comprises sixty-four bytes which provide the S12 tone bus.

Field 9 comprises four bits for providing the most significant nibble of the shelf identifier. As described in more detail above in connection with FIG. 3, these four bits are inserted by an upper level distribution module. For the embodiment in which the upper level distribution modules provide signals to twelve intermediate level distribution modules, the value in Field 9 ranges from 0000 to 1011.

Field 10 comprises four bits for providing the second nibble of the shelf identifier. These four bits are inserted by an intermediate level distribution module. For the embodiment in which the intermediate level distribution modules provide signals to eight lower level distribution modules, this value ranges from 0000 to 0111.

Field 11 comprises eight bits, four of which provide the least significant nibble of the shelf identifier.

These four bits are inserted by a lower level distribution module. For the embodiment in which the lower level distribution modules provide signals to twelve bus control modules, this value ranges from 0000 to 1011. The remaining four bits of Field 11 may be used to communicate any suitable data.

Fields 12–14 include the same information as Fields 9–11 in order to ensure valid bit interleaved parity for the frame 304. Thus, Field 12 comprises four bits for providing the most significant nibble of the shelf identifier. These four bits are inserted by an upper level distribution module. For the embodiment in which the upper level distribution modules provide signals to twelve intermediate level distribution modules, this value ranges from 0000 to 1011.

Field 13 comprises four bits for providing the second nibble of the shelf identifier. These four bits are inserted by an intermediate level distribution module. For the embodiment in which the intermediate level distribution modules provide signals to eight lower level distribution modules, this value ranges from 0000 to 0111.

Field 14 comprises eight bits, four of which provide the least significant nibble of the shelf identifier. These four bits are inserted by a lower level distribution module. For the embodiment in which the lower level distribution modules provide signals to twelve bus control modules, this value ranges from 0000 to 1011. The remaining four bits of Field 14 may be used to communicate any suitable data.

Field 15 comprises eight bits, one of which indicates whether or not a clock has been selected by an upper level distribution module 206*a–b*, four of which identify a selected port, one of which may be set to force an alarm, and two of which may be used for communicating any suitable data. Field 16 comprises eight bits, one of which indicates whether or not a clock has been selected by an intermediate level distribution module, four of which identify a selected port, one of which may be set to force an alarm, and two of which may be used for communicating any suitable data. Field 17 comprises eight bits, one of which indicates whether or not a clock has been selected by a lower level distribution module 208*a–b*, four of which identify a selected port, one of which may be set to force an alarm, and two of which may be used for communicating any suitable data.

Fields 18–27 each comprise six bytes allocated for a particular shelf 209. For the exemplary embodiment, the first byte in each of Fields 18–27 provides reset information. Thus, each bit may represent one of eight slots for receiving cards 212 in a shelf 209 and may be changed from 0 to 1 or from 1 to 0 to indicate that the corresponding slot should be reset. The second byte comprises a bit for resetting the bus control module 210, a bit for resetting a first Ethernet switch, a bit for resetting a second Ethernet switch, a reserved reset bit, a bit which may be set to cause a loop back 8 kHz and three bits for I1, I2 and I3. The third byte comprises power down information. Each bit indicates whether or not a corresponding slot should be powered down.

The fourth byte comprises a bit that indicates whether or not a clock has been selected by the bus control module 210, three bits to identify the selected clock, two bits to identify the selected plane 201*a–b*, one bit for turning on or off a rack alarm, and one bit to force shelf alarms. The fifth byte comprises four bits for a synchronization status message code, one bit for indicating errors on plane 201*a*, one bit for indicating errors on plane 201*b*, and two bits for communicating any suitable data. The sixth byte comprises eight bits allocated to tri-state the back plane signals for each printed board assembly such as a card 212.

Field 28 comprises five bytes for communicating any suitable data. Field 29 comprises six bytes allocated for the system alarm card. Field 30 comprises one byte for providing a BIP check.

Figure 4B:
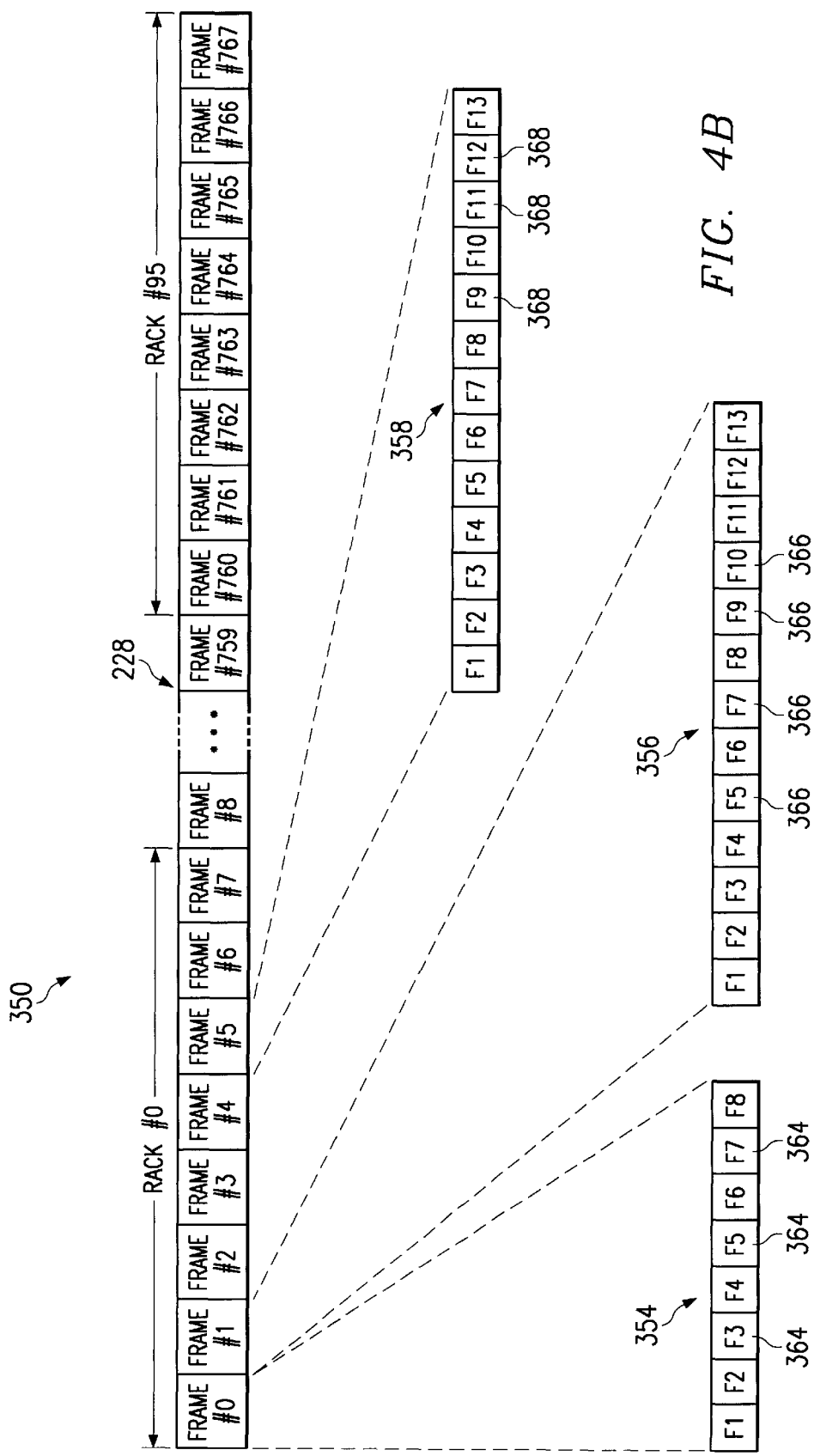
FIG. 4B is a block diagram illustrating a frame structure for a feedback signal provided by the system of FIG. 3 in accordance with one embodiment of the present invention.

FIG. 4B is a block diagram illustrating a frame structure 350 for a feedback signal 228 provided by the system 200 in accordance with one embodiment of the present invention. According to the exemplary embodiment, the feedback signal 228 comprises 768 frames, with eight frames provided for each of ninety-six racks. Each frame is approximately 125 microseconds, making the feedback signal 228 approximately 96 milliseconds.

In accordance with the exemplary embodiment, the frame structure 350 comprises three different types of frames: a high frame 354, an intermediate/low frame 356, and a bus control frame 358. Thus, the frames 354, 356 and 358 are allocated for specified modules to transmit information upstream. For the exemplary embodiment, the high frame 354 comprises Frame 0, which is allocated for the upper level distribution module. The intermediate/low frames 356 comprise Frames 1+64n (n=0 to 11), which are allocated for the intermediate level distribution modules, and also Frames 1+8n (n=0 to 95), which are allocated for the lower level distribution modules. As described in more detail below, the intermediate/low frames 356 provide for transmitting information from both types of modules within the same frame 356. The bus control frames 358 comprise Frames X+8n (X=2 to 7, n=0 to 95), which are each allocated for a pair of bus control modules 210a–b. Thus, each module 206a–b, 208a–b and 210a–b is provided a specified frame within the feedback signal 228 for inserting status information to be communicated to the system 200. As the status information from all these components is provided within a single feedback signal 228, the number of lines needed to provide the status information is reduced. In accordance with one embodiment, Frames 8n (n=1 to 95) are empty.

For the exemplary embodiment, the high frame 354, or Frame 0, comprises eight fields 364. However, it will be understood that Frame 0 may comprise any suitable number of fields 364 without departing from the scope of the present invention.

According to the exemplary embodiment, Field 1 of Frame 0 comprises one byte for providing an alignment pattern. Field 2 comprises one byte for providing miscellaneous signals. Field 3 comprises two bytes for providing a loss of alignment feedback signal. Field 4 comprises two bytes for indicating inbound errors, with one bit provided for each port. Field 5 comprises one byte for clock selection. Field 6 comprises four bits for providing bit interleaved parity. Field 7 comprises 7.5 bytes for communicating any suitable data. Field 8 comprises 1.5 bits and is designated as an empty field 364. Thus, Field 8 is forced to a zero in order to allow synchronization for a following frame.

For the exemplary embodiment, the intermediate/low frames 356 comprise thirteen fields 366. However, it will be understood that the frames 356 may comprise any suitable number of fields 366 without departing from the scope of the present invention. Because one out of every eight of the intermediate/low frames 356 are allocated for both an intermediate level distribution module and a lower level distribution module, the first six fields 366 of each intermediate/low frame 356 include information from the intermediate level distribution modules in only one out of eight intermediate/low frames 356. For the remaining seven out of eight intermediate/low frames 356, the first six fields 366 are empty. For all the intermediate/low frames 356, Fields 7–12 include information from the lower level distribution modules.

Field 1 comprises two bits for communicating any suitable data, one bit for indicating the detection of an outbound SFI error, one bit for indicating a loss of the feedback signal 228, one bit for indicating a loss of the selected 8 kHz clock, two bits to indicate the level of the distribution module and one bit to indicate the selected plane 201a–b. According to one embodiment, the bits to indicate the level of the distribution module may be 11 for the upper level distribution modules, 10 for intermediate level distribution modules, and 01 for lower level distribution modules. Field 2 comprises eight bits, four of which provide an identifier for the distribution module and four of which communicate any suitable data.

Field 3 comprises two bytes for indicating a loss of alignment status for each of twelve corresponding ports. Field 4 comprises two bytes for indicating a loss of signal status for each of twelve corresponding ports. Field 5 comprises eight bits, one for indicating that an 8 kHz clock has been selected, four for indicating which 8 kHz port has been selected, one for indicating that a forced alarm bit has been received, one for indicating that a system alarm has occurred in the previous feedback signal 228, and one for indicating that a BIP error was detected by a timing generator 202a–b. Field 6 comprises four bits for BIP checking.

Field 7 comprises two bits for communicating any suitable data, one bit for indicating the detection of an outbound SFI error, one bit for indicating a loss of the feedback signal 228, one bit for indicating a loss of the selected 8 kHz clock, two bits to indicate the level of the distribution module and one bit to indicate the selected plane 201a–b. According to one embodiment, the bits to indicate the level of the distribution module may be 11 for the upper level distribution modules, 10 for intermediate level distribution modules, and 01 for lower level distribution modules. Field 8 comprises eight bits, four of which provide an identifier for the distribution module and four of which communicate any suitable data.

Field 9 comprises two bytes for indicating a loss of alignment status for each of sixteen corresponding ports. Field 10 comprises two bytes for indicating a loss of signal status for each of sixteen corresponding ports. Field 11 comprises eight bits, one for indicating that an 8 kHz clock has been selected, four for indicating which 8 kHz port has been selected, one for indicating that a forced alarm bit has been received, one for indicating that a system alarm has occurred in the previous feedback signal 228, and one for indicating that a BIP error was detected by a timing generator 202a–b. Field 12 comprises four bits for BIP checking. Field 13, which comprises 1.5 bits, is forced to zero in order to allow synchronization for a following frame.

For the exemplary embodiment, the bus control frames 358 comprise thirteen fields 368. However, it will be understood that the frames 358 may comprise any suitable number of fields 368 without departing from the scope of the present invention. The first six fields include information from the bus control modules for planes 201a, and the next six fields include information from the bus control modules for planes 201b.

Field 1 comprises two bytes. These bytes include two bits for indicating an alarm for a first power supply, two bits for indicating an alarm for a second power supply, two bits for indicating two fan alarms, two bits for indicating an Ethernet switch power alarm, one bit for indicating a breaker panel alarm, one bit for temperature control, one bit for indicating the loss of plane 201a, one bit for indicating the loss of plane 201b, one bit for indicating a two-bit violation for plane 201a, one bit for indicating a two-bit violation for plane 201b, one bit for indicating that a forced alarm bit was received, and one bit for communicating any suitable data.

Field 2 comprises two bytes. These bytes include twelve bits for providing a bus control module identifier, one bit for indicating that an 8 kHz clock has been selected, and three bits to identify which clock has been selected. Field 3 comprises eight bits for indicating the status of a printed board assembly such as a card 212 for each of eight corresponding slots. Field 4 comprises eight bits for indicating the presence of a printed board assembly such as a card 212 in each of eight corresponding slots.

Field 5 comprises eight bits, one for indicating that a mismatched plane assignment was detected, one for indicating which plane 201a–b was selected, one for indicating that a system-slot-installed bit was received, one for indicating that an SFI plane alignment error was generated, one for indicating the loss of the selected 8 kHz clock, one for indicating an alarm from a bus control module 210a–b, and one for indicating that a BIP error was detected. Field 6 comprises four bits for providing BIP checking.

Field 7 comprises two bytes. These bytes include two bits for indicating an alarm for a first power supply, two bits for indicating an alarm for a second power supply, two bits for indicating two fan alarms, two bits for indicating an Ethernet switch power alarm, one bit for indicating a breaker panel alarm, one bit for temperature control, one bit for indicating the loss of plane 201*a*, one bit for indicating the loss of plane 201*b*, one bit for indicating a two-bit violation for plane 201*a*, one bit for indicating a two-bit violation for plane 201*b*, one bit for indicating that a forced alarm bit was received, and one bit for communicating any suitable data.

Field 8 comprises two bytes. These bytes include twelve bits for providing a bus control module identifier, one bit for indicating that an 8 kHz clock has been selected, and three bits to identify which clock has been selected. Field 9 comprises eight bits for indicating the status of a printed board assembly such as a card 212 for each of eight corresponding slots. Field comprises eight bits for indicating the presence of a printed board assembly such as a card 212 in each of eight corresponding slots.

Field 11 comprises eight bits, one for indicating that a mismatched plane assignment was detected, one for indicating which plane 201*a–b* was selected, one for indicating that a system-slot-installed bit was received, one for indicating that an SFI plane alignment error was generated, one for indicating the loss of the selected 8 kHz clock, one for indicating an alarm from a bus control module 210*a–b*, and one for indicating that a BIP error was detected. Field 12 comprises four bits for providing BIP checking. Field 13, which comprises 1.5 bits, is forced to zero in order to allow synchronization for a following frame.

Figure 5:
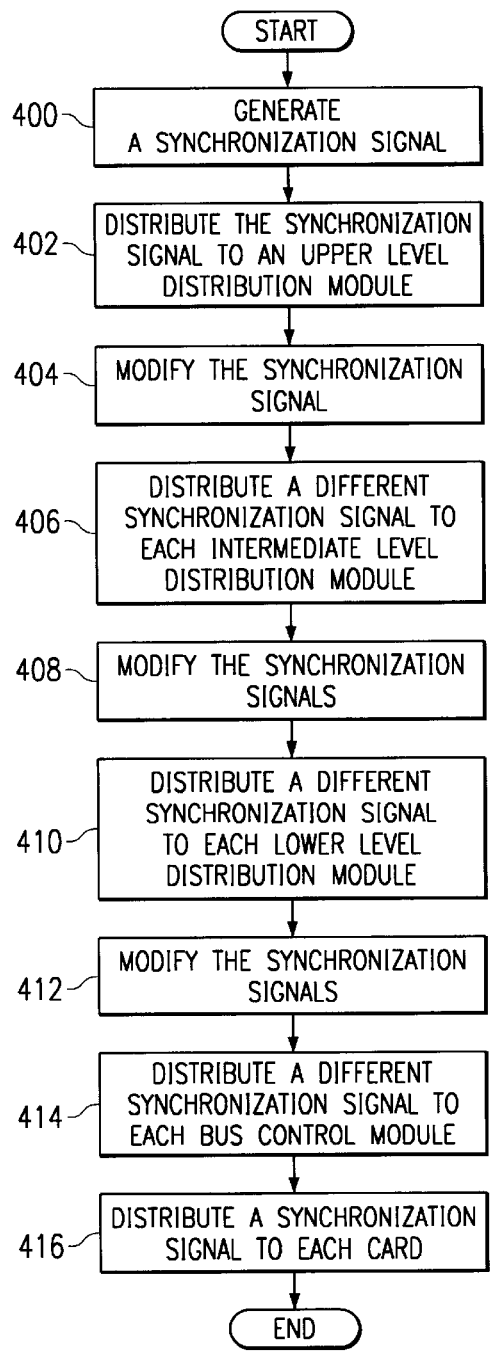
FIG. 5 is a flow diagram illustrating a method for distributing a synchronization signal in a telecommunications network such as the network of FIG. 1 in accordance with one embodiment of the present invention.

FIG. 5 is a flow diagram illustrating a method for distributing a synchronization signal 224 in a telecommunications network such as the network 10 in accordance with one embodiment of the present invention. The method begins at step 400 where a timing generator generates a synchronization signal 224. In step 402, the timing generator distributes the synchronization signal 224 to an upper level distribution module.

In step 404, the upper level distribution module modifies the synchronization signal 224. For example, the upper level distribution module inserts a most significant nibble for a shelf identifier into the signal 224. The upper level distribution module inserts a different value for the shelf identifier for each downstream intermediate level distribution module. Thus, in step 406, the upper level distribution module distributes a different synchronization signal 224 to each of a plurality of intermediate level distribution modules.

In step 408, each intermediate level distribution module modifies the synchronization signal 224 from the upper level distribution module. For example, an intermediate level distribution module inserts a second nibble for the shelf identifier into the signal 224. A different value for the shelf identifier is inserted for each downstream lower level distribution module. Thus, in step 410, each intermediate level distribution module distributes a different synchronization signal 224 to each of a plurality of lower level distribution modules.

In step 412, each lower level distribution module modifies the synchronization signal 224 from the intermediate level distribution module. For example, each lower level distribution module inserts a least significant nibble for the shelf identifier into the signal 224. A different value for the shelf identifier is inserted for each downstream bus control module. Thus, in step 414, each lower level distribution module distributes a different synchronization signal 224 to each of a plurality of bus control modules. In step 416, each bus control module distributes a unique synchronization signal 224, including a unique shelf identifier, to each card inserted into the shelf comprising the bus control module. Thus, each card is synchronized based on a signal 224 from a central location. In addition, each card receives control information from the central location regarding the performance of specified functions by the card for the system.

Figure 6:
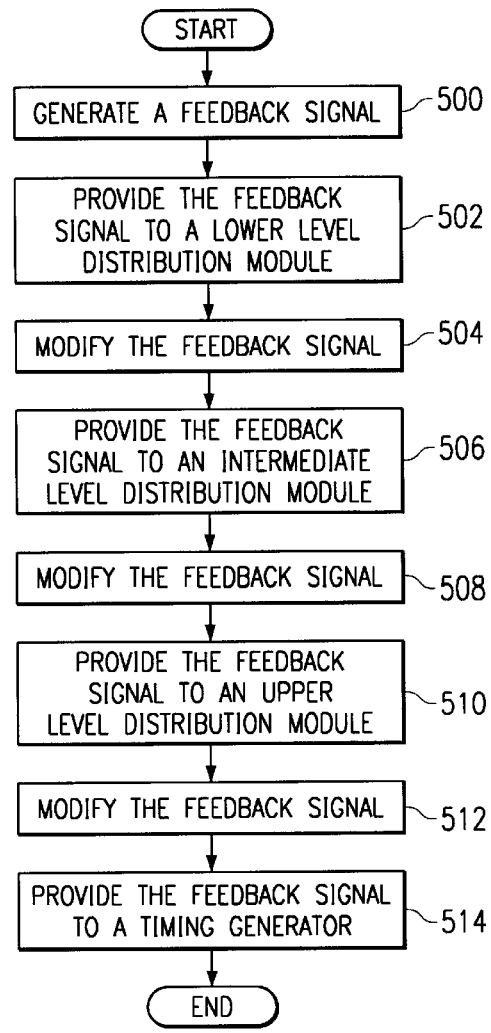
FIG. 6 is a flow diagram illustrating a method for providing a feedback signal in a telecommunications network such as the network of FIG. 1 in accordance with one embodiment of the present invention.

FIG. 6 is a flow diagram illustrating a method for providing a feedback signal 228 in a telecommunications network such as the network 10 in accordance with one embodiment of the present invention. The method begins at step 500 where a plurality of bus control modules generate a feedback signal 228 based on status information, such as alarm signals, from a plurality of cards for each bus control module. In step 502, the bus control modules provide the feedback signal 228 to a plurality of lower level distribution modules.

In step 504, the lower level distribution modules modify the feedback signal 228 by inserting status information for the lower level distribution modules into the signal 228. In step 506, the lower level distribution modules provide the feedback signal 228 to a plurality of intermediate level distribution modules.

In step 508, the intermediate level distribution modules modify the feedback signal 228 by inserting status information for the intermediate level distribution modules into the signal 228. In step 510, the intermediate level distribution modules provide the feedback signal 228 to an upper level distribution module.

In step 512, the upper level distribution module modifies the feedback signal 228 by inserting status information for the upper level distribution module into the signal 228. In step 514, the upper level distribution module provides the feedback signal 228 to a timing generator.

The timing generator may then provide the feedback signal 228 to a controller which may respond to the status information in the feedback signal 228. Thus, each card and module may provide feedback information to a central location by adding to the signal 228.

Although an embodiment of the invention and its advantages are described in detail, a person skilled in the art could make various alternations, additions, and omissions without departing from the spirit and scope of the present invention as defined by the appended claims.

What is claimed is:

1. A system for distributing a synchronization signal in a telecommunications network, comprising:
   a timing generator operable to provide a synchronization signal comprising timing and control signals;
   a lower level distribution module coupled to the timing generator, the lower level distribution module operable to receive and distribute the synchronization signal;
   an intermediate level distribution module coupled to the timing generator and to the lower level distribution module, the intermediate level distribution module operable to receive and distribute the synchronization signal;
   an upper level distribution module coupled to the timing generator and to the intermediate level distribution module, the upper level distribution module operable to receive and distribute the synchronization signal;
   a bus control module coupled to the lower level distribution module, the bus control module operable to receive and distribute the synchronization signal; and
   a plurality of cards coupled to the bus control module, each card operable to receive the synchronization signal and to synchronize based on the timing signals.

2. The system of claim 1, the synchronization signal comprising a shelf identifier, the upper level distribution module operable to insert a first portion of a shelf identifier, the intermediate level distribution module operable to insert a second portion of the shelf identifier, and the lower level distribution module operable to insert a third portion of the shelf identifier.

3. A method for distributing a synchronization signal in a telecommunications network, comprising:

generating a synchronization signal comprising timing and control signals;

distributing the synchronization signal to a first-level distribution module;

distributing the synchronization signal from the first-level distribution module to a plurality of bus control modules;

distributing the synchronization signal from the first-level distribution module to a plurality of bus control modules comprising distributing the synchronization signal from the first-level distribution module to a second-level distribution module; and distributing the synchronization signal from the first-level distribution module to a plurality of bus control modules further comprising distributing the synchronization signal from the second-level distribution module to a third-level distribution module.

4. The method of claim 3, further comprising:

inserting into the synchronization signal a first portion of a shelf identifier at the first-level distribution module;

inserting into the synchronization signal a second portion of the shelf identifier at the second-level distribution module; and inserting into the synchronization signal a third portion of the shelf identifier at the third-level distribution module.

5. The method of claim 4, inserting a first portion of a shelf identifier comprising inserting a unique first portion into each of a plurality of synchronization signals, and distributing the synchronization signal to a plurality of bus control modules comprising distributing each of the plurality of synchronization signals to a distinct bus control module.

6. The method of claim 3, the synchronization signal comprising a specified number of frames, the specified number evenly divisible by twenty-four and sixteen.

7. The method of claim 3, the synchronization signal comprising ninety-six frames.

8. The method of claim 3, the synchronization signal comprising a plurality of frames, each frame comprising a first section and a second section, the first section comprising alternating bits and the second section comprising pairs of repeating bits.

9. The method of claim 3, further comprising generating a same control signal in at least three consecutive synchronization signals.

10. A method for distributing a synchronization signal in a telecommunications network, comprising:

generating a synchronization signal with a timing generator, the synchronization signal comprising timing and control signals;

distributing the synchronization signal from the timing generator to a first-level distribution module;

distributing the synchronization signal from the first-level distribution module to a plurality of second-level distribution modules;

distributing the synchronization signal from each second-level distribution module to a plurality of third-level distribution modules; and distributing the synchronization signal from each third-level distribution module to a plurality of bus control modules.

11. The method of claim 10, further comprising:

distributing the synchronization signal from each bus control module to a plurality of cards; and synchronizing each card based on the timing signals.

12. The method of claim 10, further comprising:

inserting a first portion of a shelf identifier at a first location in the synchronization signal;

inserting a second portion of the shelf identifier at a second location in the synchronization signal; and inserting a third portion of the shelf identifier at a third location in the synchronization signal.

13. The method of claim 12, inserting a first portion of the shelf identifier comprising inserting a unique first portion at the first location for each of the plurality of second-level distribution modules, inserting a second portion of the shelf identifier comprising inserting a unique second portion at the second location for each of the plurality of third-level distribution modules, and inserting a third portion of the shelf identifier comprising inserting a unique third portion at the third location for each of the plurality of bus control modules.

14. The method of claim 10, the synchronization signal comprising ninety-six frames.

15. The method of claim 10, the synchronization signal comprising a plurality of frames, each frame comprising a first section and a second section, the first section comprising alternating bits and the second section comprising pairs of repeating bits.

16. The method of claim 10, further comprising generating at least three consecutive synchronization signals each comprising a same control signal.

* * * * *